Figure 1:
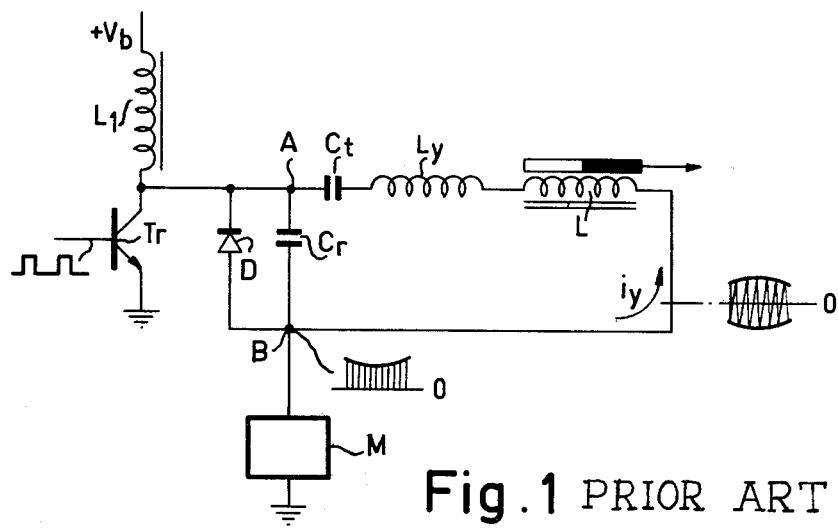

United States Patent [19]

Boekhorst

[11] 4,024,432
[45] May 17, 1977

[54] CIRCUIT ARRANGEMENT IN AN IMAGE DISPLAY APPARATUS FOR (HORIZONTAL) LINE DEFLECTION

[75] Inventor: Antonius Boekhorst, Eindhoven, Netherlands

[73] Assignee: U.S. Philips Corporation, New York, N.Y.

[22] Filed: July 22, 1975

[21] Appl. No.: 598,014

[30] Foreign Application Priority Data

Aug. 19, 1974  Netherlands ...................... 7411046

[52] U.S. Cl. .............................. 315/371; 315/400
[51] Int. Cl.² ..................................... H01J 29/56
[58] Field of Search .......... 315/399, 400, 370, 371, 315/370 LC

[56] References Cited

UNITED STATES PATENTS

| | | | |
|---|---|---|---|
| 3,149,260 | 9/1964 | Davies | 315/370 LC |
| 3,440,482 | 4/1969 | Lister et al. | 315/399 |
| 3,906,305 | 9/1975 | Nillesen | 315/399 |

Primary Examiner—Richard A. Farley
Assistant Examiner—T. M. Blum
Attorney, Agent, or Firm—Frank R. Trifari; Henry I. Steckler

[57] ABSTRACT

Line deflection circuit in which the deflection coil is east-west modulated. In order to cancel an east-west dependent horizontal linearity defect the inductance value of the linearity correction coil is made independent of the field frequency, for example by means of a compensating current. In an embodiment this current is supplied by the shunt coil of the east-west modulator.

8 Claims, 7 Drawing Figures

CIRCUIT ARRANGEMENT IN AN IMAGE DISPLAY APPARATUS FOR (HORIZONTAL) LINE DEFLECTION

The invention relates to a circuit arrangement in an image display apparatus for (horizontal) line deflection, which apparatus also includes a circuit arrangement for (vertical) field deflection, provided with a generator for generating a sawtooth line-frequency deflecting current through a line deflection coil and with a modulator for field-frequency modulation of this current, the deflection coil being connected in series with a linearity correction coil in the form of an inductor having a bias-magnetized core.

By means of the linearity correction coil the linearity error due to the ohmic resistance of the deflection circuit is corrected. The sign of the bias magnetisation is chosen so that it is cancelled by the deflection current at the beginning of the deflection interval, so that the inductance of the correction coil is a maximum, whereas the voltage drop across the deflection coil then is a minimum. This voltage drop is adjustable by adjustment of the starting inductance of the correction coil. During the deflection interval the core gradually becomes saturated so that the inductance of, and the voltage drop across, the correction coil decrease. Thus the linearity error can be cancelled exactly at the beginning of the interval, that is to say on the left on the screen of the image display tube, and with a certain approximation at other locations.

In image display tubes using a large deflection angle, raster distortion, which generally is pincushion-shaped, of the image displayed occurs. This distortion can be removed in the horizontal direction, the so-called east-west direction, by means of field-frequency modulation of the line deflection current, the envelope in the case of pincushion-shaped distortion being substantially parabolic so that the amplitude of the line deflection current is a maximum at the middle of the field deflection interval.

It was found in practice that the said two corrections are not independent of one another, that is to say the adjustment of the east-west modulation affects horizontal linearity. As long as the modulation depth is not excessive, a satisfactory compromise can be found. However, in display tubes having a deflection angle of 110° and particularly in colour display tubes in which the deflection coils have a converging effect also, it is difficult to find such a compromise. A tube of this type is described in "Philips Research Reports," volume Feb. 14, 1959, pages 65 to 97; the distribution of the deflection field is such that throughout the display screen the landing points of the electron beams coincide without the need for a converging device. Owing to this field distribution, however, the pin-cushion-shaped distortion in the image displayed in the east-west direction is greater than in comparable display tubes of another type. Hence there must be east-west modulation of the line deflection current to a greater depth. It is true that under these conditions horizontal linearity can correctly be adjusted over a given horizontal strip after the east-west modulation has been adjusted correctly, i.e., for a rectangular image, but it is found that in other parts of the display screen a serious linearity error remains. When vertical straight lines are displayed as straight lines in the right-hand part of the screen, they are displayed as curved lines in the left-hand part.

It is an object of the present invention to remove the said defect so that horizontal linearity can satisfactorily be adjusted throughout the screen, and for this purpose the circuit arrangement according to the invention is characterized in that it includes means by which the inductance of the linearity correction coil is made substantially independent of the field frequency.

The invention is based on the recognition that the defect to be removed is due to a field-frequency variation of the said inductance because the latter is current-dependent. According to a further recognition of the invention the circuit arrangement is characterized in that it includes a current supply source for producing a compensating line-frequency sawtooth current through a winding of the linearity correction coil, the amplitude of the current being field-frequency modulated. The circuit arrangement according to the invention may further be characterized in that an additional winding is provided on the core of the linearity correction coil and is traversed by the compensating current. A circuit arrangement in which the modulator for modulating the line deflection current includes a compensation or bridge coil may according to the invention be characterized in that the additional winding is connected in series with the said coil.

The invention also relates to a linearity correction coil for use in a line deflection circuit having a core which is made of a magnetic material and is bias magnetized by at least one permanent magnet, which coil is characterized in that an additional winding is provided on the core.

Figure 2:
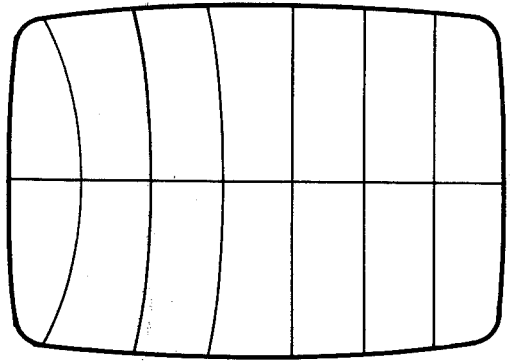
Figure 4:
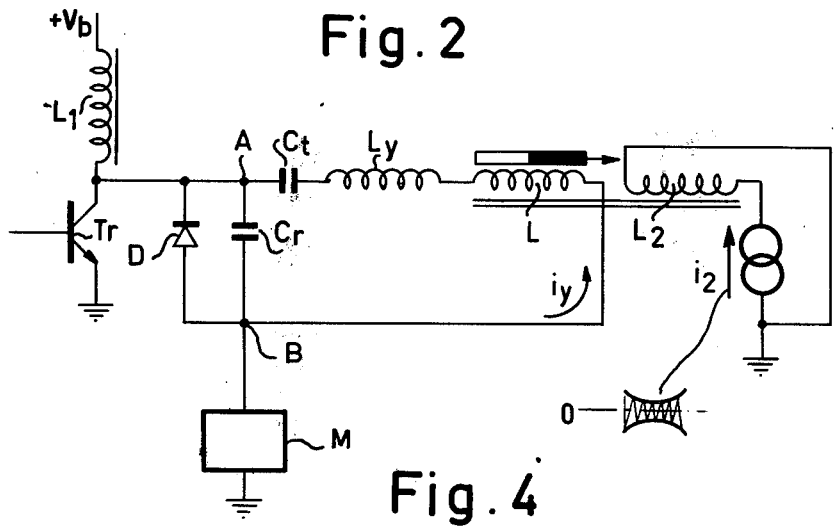
Figure 3:
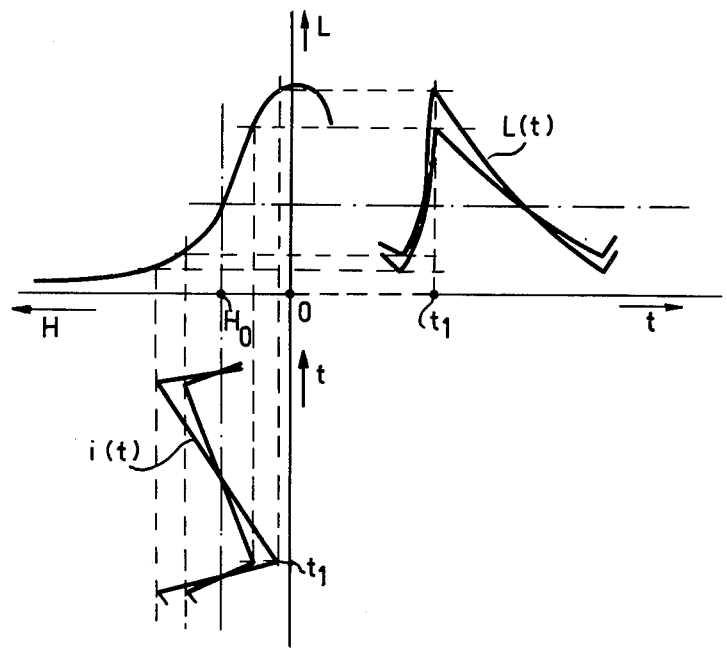
Figure 7:
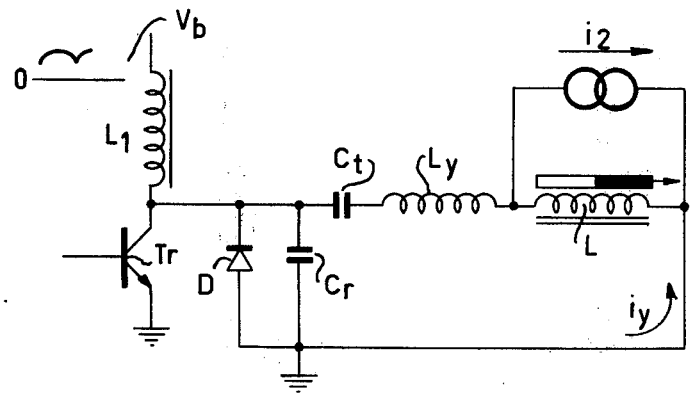

Embodiments of the invention will now be described by way of example, with reference to the accompanying diagrammatic drawings, in which FIG. 1 is the circuit diagram of a known circuit arrangement for line deflection in which the line deflection current is east-west modulated, FIG. 2 shows the distorted image which is displayed on the screen when the circuit arrangement of FIG. 1, FIG. 3 is a graph explaining the observed defect, and FIGS. 4 and 7 show embodiments of the circuit arrangement according to the invention by which this defect can be cancelled.

FIG. 1 is a greatly simplified circuit diagram of a line deflection circuit of an image display apparatus, not shown further. The circuit includes the series combination of a line deflection coil $L_y$, a linearity correction coil L and a trace capacitor $C_t$, which series combination is traversed by the line deflection current $i_y$. The collector of an npn switching transistor $T_r$ and one end of a choke coil $L_1$ are connected to a junction point A of a diode D, a capacitor $C_r$ and the said series combination. The other end of the choke coil is connected to the positive terminal of a supply voltage source which supplies a substantially constant direct voltage $V_b$ and to the negative terminal of which the emitter of transistor $T_r$ is connected. This negative terminal may be connected to earth. The other junction point B of elements D and $C_r$ and of the series combination of elements $C_t$, $L_y$ and L is connected to one terminal of a modulation source M for east-west correction which has its other terminal connected to earth. Diode D has the pass direction shown in the FIG.

To the base of transistor $T_r$ line-frequency switching pulses are supplied. In known manner the said series combination is connected to the supply voltage source during the deflection interval (the trace time), diode D and transistor Tr conducting alternately. During the retrace time these elements are both cut off. Under these conditions the current $i_y$ is a sawtooth current. The coil L, which has a saturable ferrite core which is bias-magnetized by means of at least one permanent magnet, serves to correct the linearity of the current $i_y$ during the trace time, whilst the capacitance of the capacitor $C_t$ is chosen so that the currenct $i_y$ is subjected to what is generally referred to as S correction. During the retrace time, at point A pulses are produced the amplitude of which is much higher than that of the voltage $V_b$ and would be constant in the absence of modulation source M. Information from the field deflection circuit, not shown, of the image display apparatus and line retrace pulses, the latter for example by means of a transformer, are supplied in known manner to modulation source M. Amplitude-modulated line retrace pulses having a field-frequency parabolic envelope, as indicated in the FIG., are produced at point B. During the line trace time the voltage at point B is zero. Thus the current $i_y$ is given the desired field-frequency modulated form which is also shown in FIG. 1.

The amplitude of the envelope in point B at the beginning and at the end of the field trace time and the amplitude of this envelope at the middle of the said time can both be adjusted so that the image displayed on the display screen of the display tube (not shown) has the correct substantially rectangular form. If, however, the required modulation depth is comparatively large, a linearity error of the line deflection is produced which cannot be removed by means of the correction coil L.

FIG. 2 shows the image of a pattern of vertical straight lines as it is displayed on the screen with the correction coil L adjusted so that horizontal linearity is satisfactory along and near the central horizontal line. In FIG. 2 the defect is exaggerated. It is found that horizontal linearity is defective in other areas of the screen so that the vertical lines are displayed correctly in the right-hand half of the screen but as curves in the left-hand path, the defect increasing as the line is farther to the left.

This phenomenon can be explained with reference to FIG. 3. In this FIG. the inductance L of the linearity correction coil is plotted as a function of the magnetic field strength H. In the absence of current, H has a value $H_0$ owing to the bias magnetization. If an approximately linear sawtooth current $i(t)$ as shown in the bottom left-hand part of FIG. 3 flows through the coil, the field strength H varies proportionally about the value $H_0$, for the mean value of the current is zero. Because the curve of L is not linear, the variation $L(t)$ of L, which is shown in the top right-hand part, is not a linear function of time. The resulting curve may be regarded as composed of a linear component and a substantially parabolic component which is to be taken into account when choosing the capacitance of capacitor $C_t$.

Because owing to the east-west modulation the amplitude of current $i(t)$ varies, the amplitude of $L(t)$ also varies. This implies a field-frequency variation of L which is non-linear. This variation is undesirable. In the case of a small variation of the amplitude of current $i(t)$ the variation of $L(t)$ can be more or less neglected, but this is no longer possible when the amplitude of current $i(t)$ varies greatly owing to the east-west modulation. $L(t)$ varies according to different curves. FIG. 3 shows two of such curves and also illustrates the fact that the undesirable variation of $L(t)$ is greatest at the beginning of the trace time and smallest at the end thereof.

FIG. 4 shows a circuit arrangement in which the defect described can be corrected. On the core of the correction coil L of the circuit of FIG. 1 an additional winding $L_2$ is provided. Winding $L_2$ is connected to a current source which produces a compensating current $i_2$ which has a line-frequency sawtooth variation and a field-frequency amplitude modulation. The envelope here also is parabolic, however, with a shape opposite to that of deflection current $i_y$, that is to say having a minimum at the middle of the field trace time. The direction of current $i_2$ and the winding sense of winding $L_2$ relative to that of coil L are chosen so that the magnetic field produced in the core by winding $L_2$ has the same direction as the field produced by coil L. Hence the two field strengths are added. The amplitude of current $i_2$ and the turns number of winding $L_2$ can be chosen so that current $i_y$ flows through inductances the total value of which is not dependent upon the field frequency. The curve $L(t)$ of FIG. 3 remains substantially unchanged. Consequently the undesirable field-frequency modulation is removed without variation of the bias magnetization, which would have been varied if current $i_2$ were a field-frequency current. Obviously the same result can be achieved by a choice such of the direction of current $i_2$ and of the winding sense of winding $L_2$ that the two field strengths are subtracted one from the other, whilst the curvature of the envelope of current $i_2$ has the same direction as that of the envelope of current $i_y$.

Figure 5:
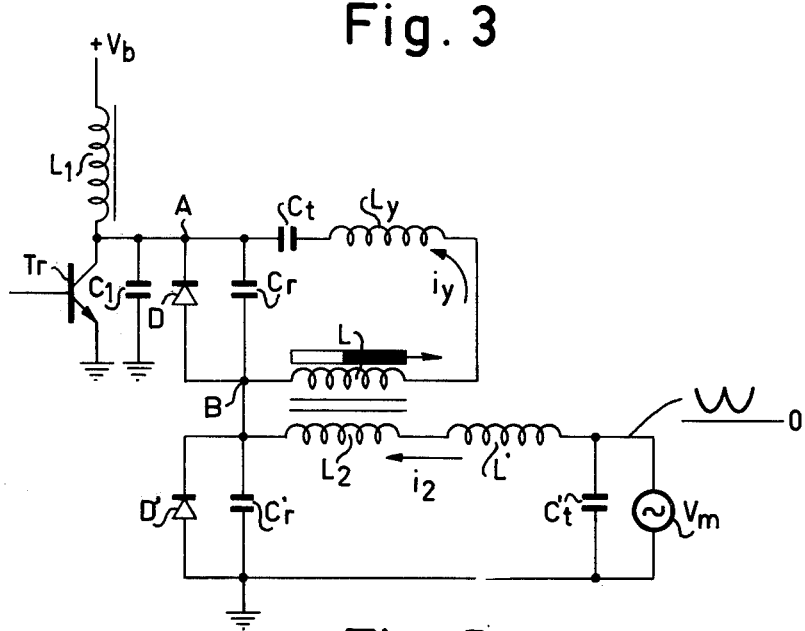

The current source of FIG. 4 may be formed in known manner by means of a modulator in which a line-frequency sawtooth signal is field-frequency modulated, the envelope being parabolic. FIG. 5 shows a circuit arrangement in which current $i_2$ is produced by the modulation source which provides the east-west correction. In FIG. 5, the source M of FIG. 1 comprises a diode D', a coil L' and two capacitors $C'_r$ and $C'_t$, which elements constitute a network of the same structure as the network formed by elements D, $L_y$, $C_r$ and $C_t$. The capacitor $C'_t$ is shunted by a modulation source $V_m$ which supplies a field-frequency parabolic voltage having a minimum at the middle of the field trace time.

With the exception of the linearity correction means to be described hereinafter, the circuit arrangement of FIG. 5 was described in more detail in U.S. Pat. No. 3,906,305. Hence it will be sufficient to mention that the capacitances of capacitors $C_r$ and $C'_r$ and of a capacitor $C_1$ connected between junction point A and earth and the inductance of coil L' are chosen so that the three sawtooth currents flowing through $L_y$, L' and $L_1$ have the same retrace time. The capacitances of capacitors $C_t$ and $C'_t$, which are large, are ignored. When voltage $V_b$ is constant, current $i_y$ is subjected to the desired east-west modulation having the form shown in FIG. 1.

Coil $L_y$ is connected in series with correction coil L, and winding $L_2$ is connected in series with coil L'. FIG. 5 shows that the current flowing through winding $L_2$ has the same waveform as the current $i_2$ of FIG. 4, for its envelope has the same shape as the voltage supplied by source $V_m$. By a suitable choice of the number of turns of winding $L_2$ it can be ensured that the linearity correction remains the same for every line during the field trace time.

Figure 6:
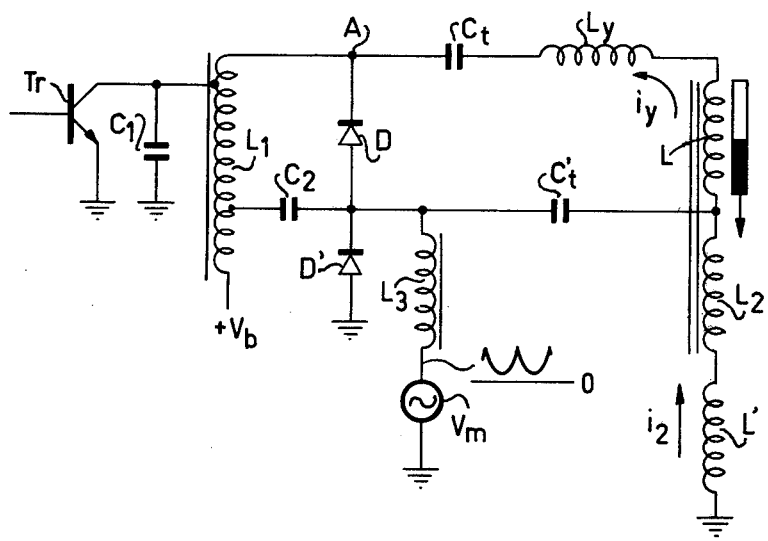

Modified embodiments of the circuit arrangement of FIG. 5 can also be used. FIG. 6 shows such a modified embodiment in which the capacitive voltage divider $C_r$, $C'_r$ of FIG. 5 is replaced by an inductive voltage divider by means of a tapping on coil $L_1$. A capacitor $C_2$ is included between the tapping and the junction point of diodes D and D', whilst capacitor $C'_t$ here forms part of two networks $C_t$, $L_y$ and $C'_t$, L' traversed by a sawtooth current. In FIG. 6 modulation source $V_m$ is connected via a choke coil $L_3$ to the junction point of D, D', $C_2$ and $C'_t$. One end of winding $L_2$ is connected to the junction point of capacitor $C'_t$ and the coil L, whilst the other end is connected to earth via coil L'. The capacitances of capacitors $C_1$ and $C_2$ and the location of the tapping on coil $L_1$ are chosen so that the sawtooth currents flowing through $L_y$, and L' and $L_1$ have the same retrace time, whilst the field-frequency linearity defect of FIg. 2 is cancelled by correctly proportioning winding $L_2$.

Other east-west modulators are known in which the step of FIGS. 5 and 6 can be used. An example is the modulator described in the publication by Philips, Electronic Components and Materials: "110° Colour television receiver with A66-140X standard-neck picture tube and DT 1062 multisection saddle yoke," May 1971, pages 19 and 20, which modulator also comprises two diodes and a compensation coil L', which are arranged in a slightly different manner. In another example the east-west modulator and the line deflection generator are included in a bridge circuit whilst they are decoupled from one another by means of a bridge coil which has the same function as coil L' in FIGS. 5 and 6. In these circuit arrangements coil L and winding $L_2$ may be arranged in the same manner as in FIG. 6. The same applies to an east-west modulator using a transductor the operating winding of which is in series with the deflection coil.

In the abovedescribed embodiments of the circuit arrangement according to the invention the compensating current $i_1$ is provided by transformer action. In the embodiment of FIG. 7 the current source which supplies the current $i_2$ is connected in parallel with correction coil L, i.e., without an auxiliary winding. In this embodiment the east-west modulation is achieved not by means of a modulator, but by means of the fact that the supply voltage $V_b$ is the super-position of a field-frequency parabolic voltage on the direct voltage. In this known manner the supply source also is the modulator.

It will be seen that in the embodiments of FIGS. 4, 5 and 6 current $i_2$ counteracts the east-west modulation of deflection current $i_y$. It was found in practice, however, that this counteraction is slight.

What is claimed is:

1. Circuit arrangement for use with a line deflection coil, said circuit comprising a generator means adapted to be coupled to said coil for producing a sawtooth line-deflection current through said line deflection coil, said deflection current having a field-frequency component current, a horizontal linearity correction coil adapted to be coupled in series with said deflection coil and including an inductor having a bias-magnetized core, and means for making the inductance value of the linearity correction coil substantially independent of the field frequency component current.

2. Circuit arrangement as claimed in claim 1, wherein said making means includes a current supply source means for producing a compensating line-frequency sawtooth current through a winding of the linearity correction coil, the amplitude of the compensating current having a field-frequency variation.

3. Circuit arrangement as claimed in claim 2, wherein the direction of curvature of the field-frequency envelope of the compensating current is opposite to the direction of curvature of the field-frequency component current of the line deflection current, whereby the magnetic fields produced in the core of the correction coil by the two currents have the same direction.

4. Circuit arrangement as claimed in claim 2, wherein the direction of curvature of the field-frequency envelope of the compensating current is the same as the direction of curvature of the field-frequency component current of the line deflection current, whereby the magnetic fields produced in the core of the correction coil by the two currents have opposite directions.

5. Circuit arrangement as claimed in claim 2, wherein said correction coil further comprises an additional winding disposed on the core, said additional winding being coupled to said supply source means to receive the compensating current.

6. Circuit arrangement as claimed in claim 5, further comprising modulator means for modulating the line deflection current with said field frequency component, said modulator including a compensation coil coupled in series with said additional winding.

7. Horizontal linearity correction coil comprising a core made of a magnetic material and bias-magnetized by at least one permanent magnet, and an additional winding disposed on the core.

8. Image display apparatus including a circuit arrangement as claimed in claim 1.

* * * * *